United States Patent [19]
Chikazawa

[11] Patent Number: 6,038,071
[45] Date of Patent: *Mar. 14, 2000

[54] APPARATUS FOR RECORDING A STEREOSCOPIC IMAGE

[75] Inventor: Yoshiharu Chikazawa, Kanagawa-ku, Japan

[73] Assignee: Deutshce Thomson-Brandt GmbH, Villingen-Schenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/739,920

[22] Filed: Oct. 30, 1996

Related U.S. Application Data

[62] Division of application No. 08/537,707, Jan. 10, 1996, abandoned.

[30] Foreign Application Priority Data

May 24, 1993 [DE] Germany .............................. 43 17 153
Jul. 26, 1993 [DE] Germany .............................. 43 24 880

[51] Int. Cl.$^7$ ........................... G02B 27/22; G02B 27/24; H04N 9/47; G03B 35/02
[52] U.S. Cl. ............................ 359/464; 359/465; 348/49; 348/56; 348/57; 348/344; 352/62; 352/65
[58] Field of Search ..................................... 359/462, 464, 359/465; 348/54–57, 343, 344, 49; 352/62, 65

[56] References Cited

U.S. PATENT DOCUMENTS

| 2,508,920 | 5/1950 | Kell ............................................ 348/57 |
| 4,678,298 | 7/1987 | Perisic ....................................... 352/62 |
| 4,943,852 | 7/1990 | Femano et al. ........................... 348/49 |
| 5,003,385 | 3/1991 | Sudo ........................................ 359/464 |
| 5,007,715 | 4/1991 | Verhulst ................................... 359/465 |
| 5,151,821 | 9/1992 | Marks ....................................... 359/462 |

*Primary Examiner*—Jon Henry
*Attorney, Agent, or Firm*—Joseph S. Tripoli; Peter M. Emanuel; Frederick A. Wein

[57] ABSTRACT

An arrangement which can produce a stereoscopic image simply and cheaply. An optical unit views an object and a stereoscopic image is provided onto a recording device or a display device by differentially polarizing the beams.

4 Claims, 18 Drawing Sheets

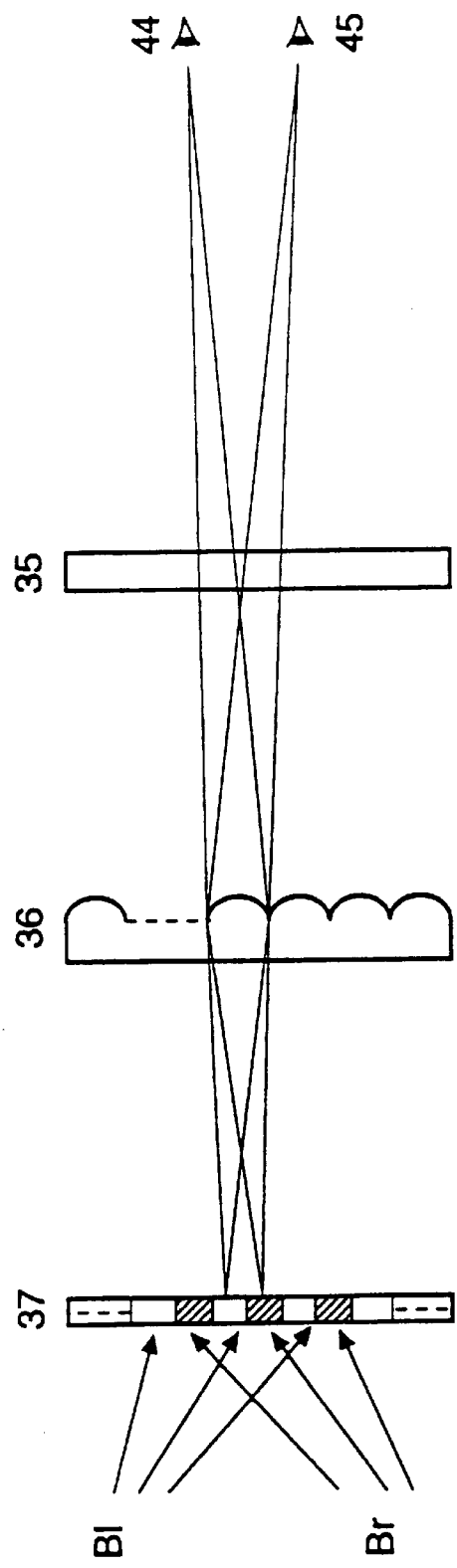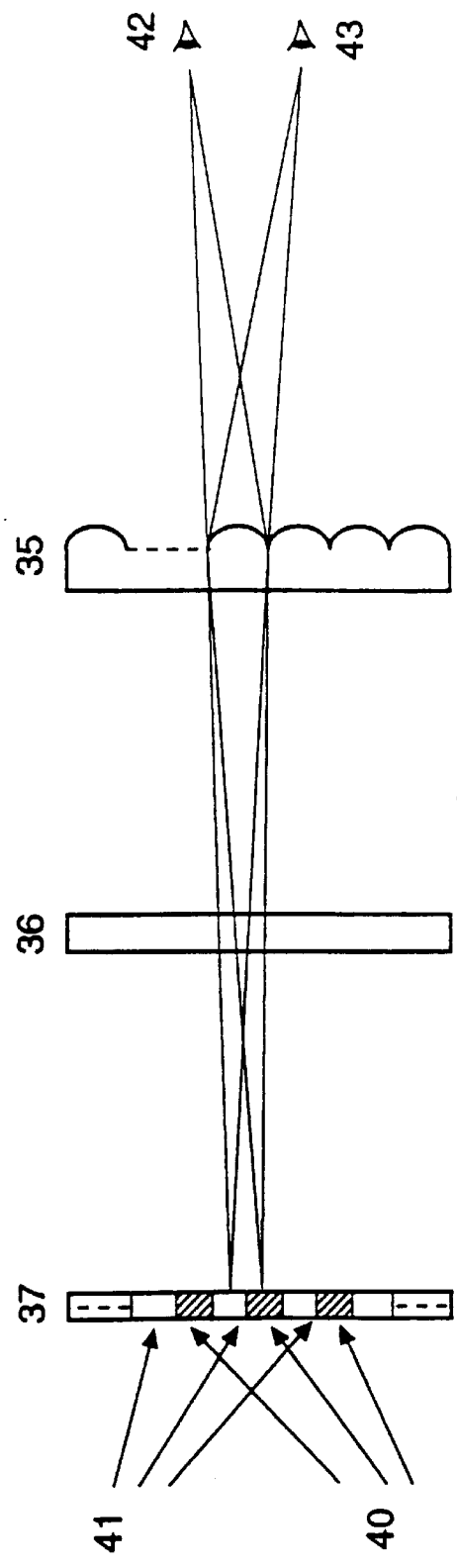

APPARATUS FOR RECORDING A STEREOSCOPIC IMAGE

This is a division of application Ser. No. 08/537,707, filed Jan. 10, 1996, now abandoned.

BACKGROUND

The invention proceeds from a process for generating a stereoscopic image.

It is known to generate a stereoscopic image with the aid of two imaging devices, two image signal processors and a special image signal processor. The special image signal processor constructs a pixel-like image for the right and left eye from two camera images, so that a stereoscopic image effect is produced. In each case, 50% of the pixels from the camera images are used. The special image signal processor is very complex and difficult to design, since the circuit must undertake a switch-over at each pixel in each case for the image of the right and left eye.

SUMMARY OF THE INVENTION

The invention is based on the object of producing a simple and inexpensive arrangement which visualizes a stereoscopic image via a pixel-like registration and/or display. This object is achieved by means of the features of the invention.

The arrangement according to the invention registers an object via an optical unit and, by means of a different polarization of the beams, a stereoscopic image is produced on an image recording device and/or from an image display device. The optical unit is divided or subdivided into two optical units for registering the object, one optical unit registering the image region for the left eye and the other optical unit registering the image region for the right eye. Each optical unit is linearly polarized using a first polarization unit. This polarization is carried out with offset angles, this angle preferably being 90°. The polarized beams from the first polarization unit are incident on a second polarization unit and are fed by this polarization unit to the image recording device and/or from the image display device.

The object to be registered is thus registered with two optical means, each optical means enabling the registration specially for one eye as a result of the polarization of the beams. The polarized beams are produced on the image recording device and/or from the image display device as a matrix which is polarized pixel by pixel, so that a stereoscopic image is produced.

In the case of a further development of the invention, the object is registered via two optical units and the beams are fed to a lens-like arrangement via formation units. This lens-like arrangement consists of a plurality of lenses which are curved upwards and are arranged side by side, the arrangement as a whole having a planar underside. As a result of the curvature, this lens-like arrangement is capable of separating the beams and of representing the registered object pixel by pixel on the image recording or image display device, so that a stereoscopic image is produced. The lens-like arrangement can preferably be substituted by a prism-like arrangement.

The invention has the advantage that only one imaging device is used. Furthermore, only one image signal processor is needed. A special image signal processor for the projection of the image is not necessary. In addition, the synchronization signal for the cameras and the special image signal processor are also no longer needed. 100% of the pixels are used. The arrangement visualizes an image pixel by pixel, so that a stereoscopic image is realized in a simple and inexpensive way.

BRIEF DESCRIPTION OF THE DRAWINGS

The invention is explained below using the drawings, in which:

FIG. 3 shows a next exemplary embodiment of the process according to the invention and FIGS. 4–29 show further exemplary embodiments.

DESCRIPTION OF THE PREFERRED EMBODIMENTS

Figure 1:
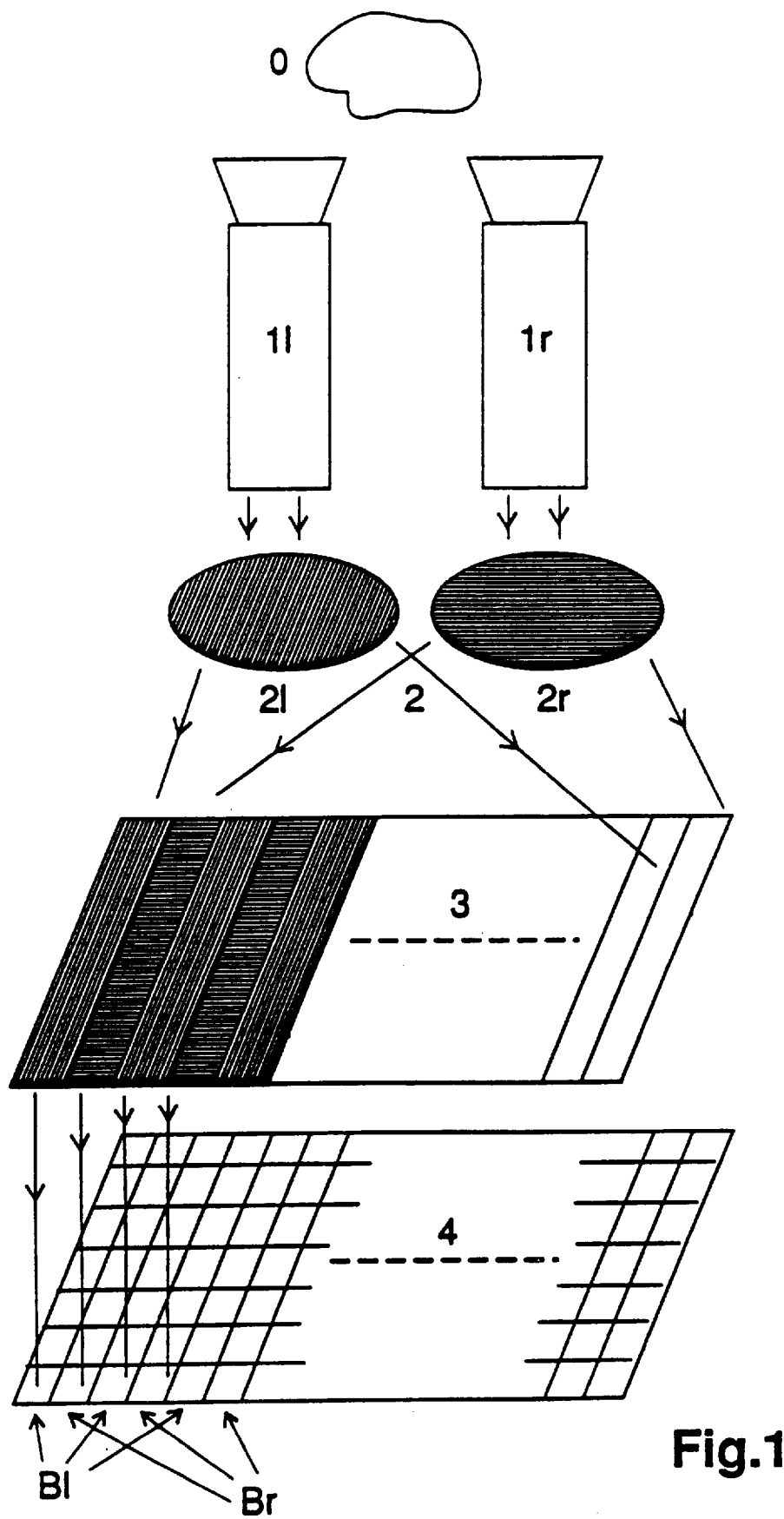
FIG. 1 shows the process according to the invention.

FIG. 1 shows the process according to the invention. An object O is registered via two optical units 1*l*, 1*r*. The optical units lead the beam path to the respective first polarization units 2*l*, 2*r*. The polarization units 2*l*, 2*r* lead the preferably mutually perpendicularly polarized beams further to a second polarization unit 3. From there, the beams pass, preferably perpendicularly, to the image recording or image display device 4. There, the beams, which are differently polarized pixel by pixel, for the left and right eye Bl, Br are imaged and generate a stereoscopic image on the image recording or image display device 4. The image recording or image display device 4 can be formed by a special CCD or LCD, so that further processing for the purposes of transmission or recording is possible.

Figure 2:
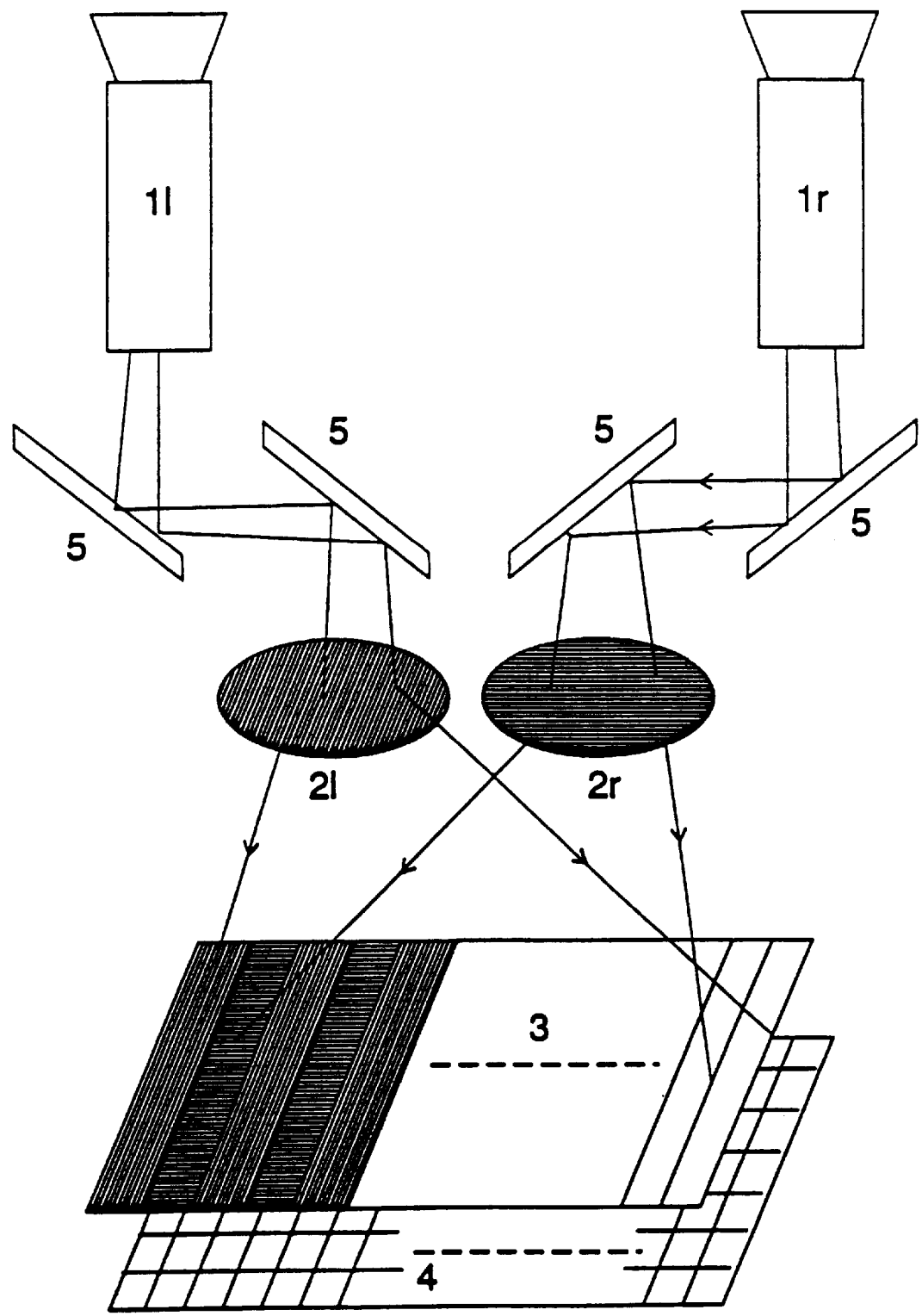
FIG. 2 shows a further exemplary embodiment of the process according to the invention.

FIG. 2 shows a further exemplary embodiment of the invention. The optical units 1*l*, 1*r* register an object O (not shown here) and lead the beams via mirrors 5 to the polarization units 2*l*, 2*r*. From there, the beams pass in turn to the polarization unit 3 and are passed on to the image recording or image display device 4.

Figure 3:
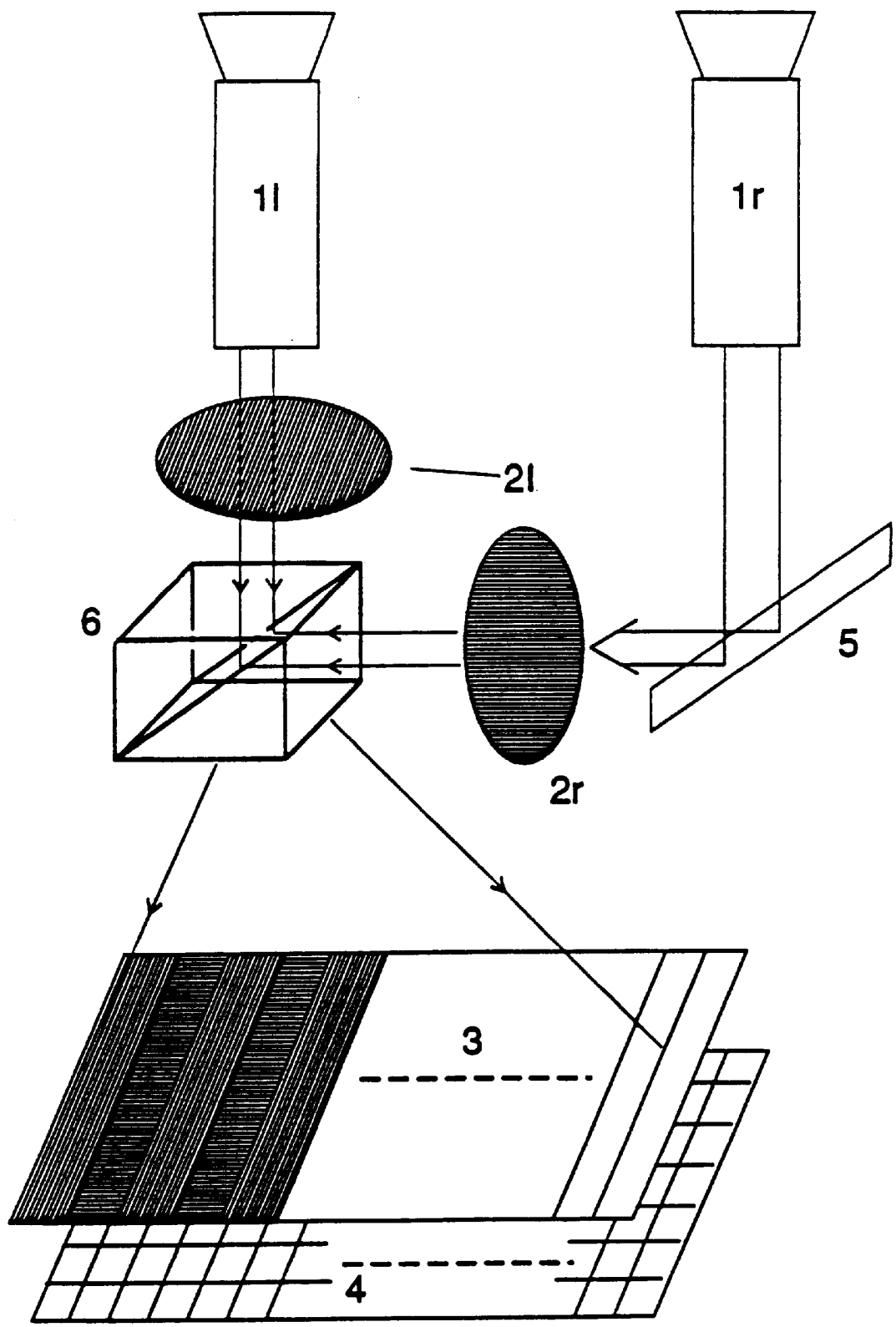

FIG. 3 shows a next exemplary embodiment of the invention. The optical units 1*l*, 1*r* register an object (not shown here). The optical unit 1*l* leads the beam path via the associated polarization unit 2*l* to the beam separator 6. The optical unit 1*r* leads the beam path to a mirror 5, which passes the beams on to the associated optical unit 2*r*. From the optical unit 2*r*, the beams pass to the beam separator 6. The beam separator 6 leads the beams from the optical units 1*l*, 1*r* to the polarization unit 3, and from there the beams pass to the image recording or image display device 4.

The image display device and image recording device are preferably designed for three-dimensional display or recording.

Figure 4:
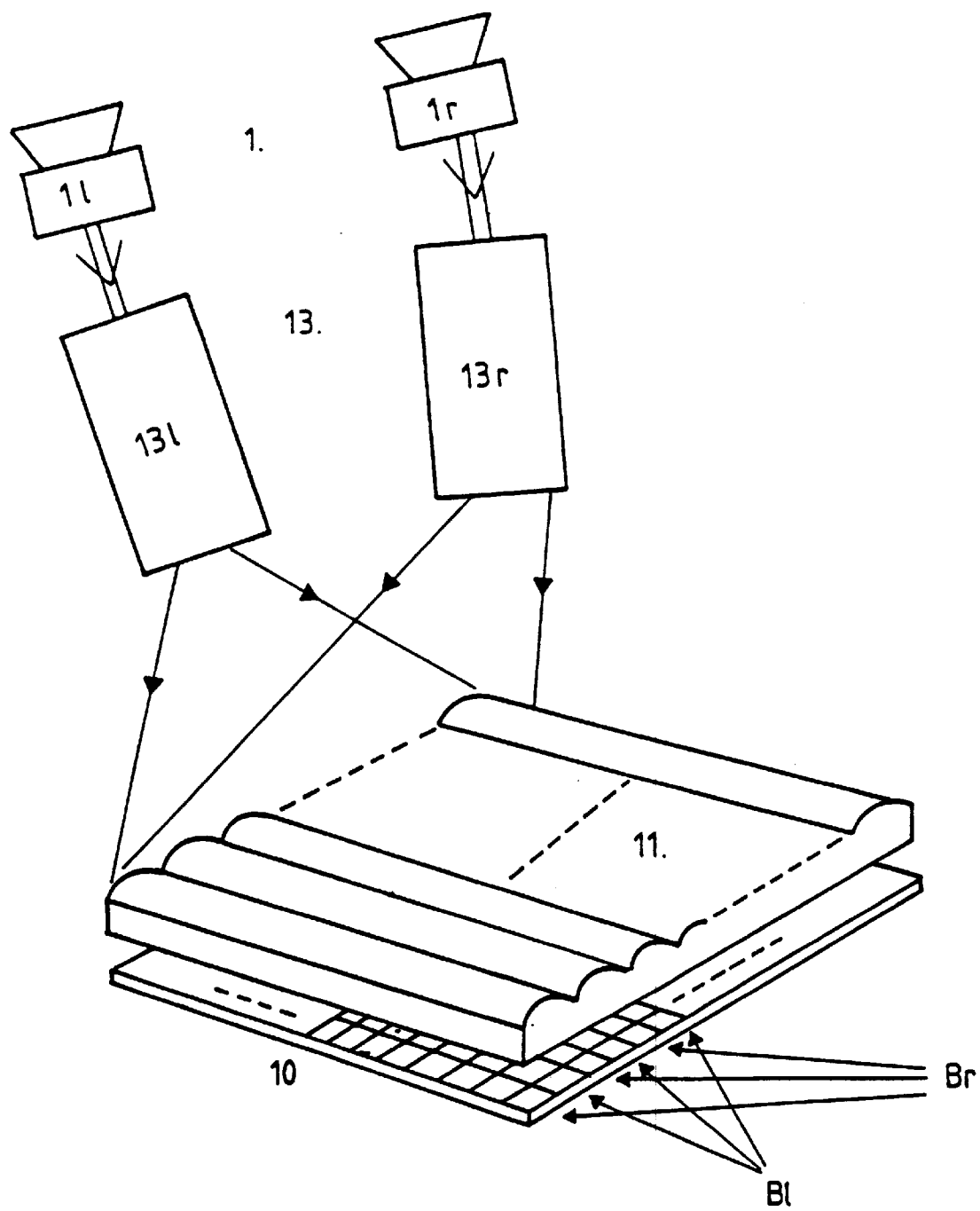

FIG. 4 shows a further exemplary embodiment of the invention. The optical units 1*l*, 1*r* lead the beams via formation units 13*l*, 13*r* and pass them to a lens-like arrangement 11. The formation units 13*l*, 13*r* ensure that in each case the beams for the left image region and for the right image region are incident on the lens-like arrangement and pass from there to the image recording or image display device 10, which in turn produces a stereoscopic image pixel by pixel for the left and right eye Bl, Br.

Figure 5:
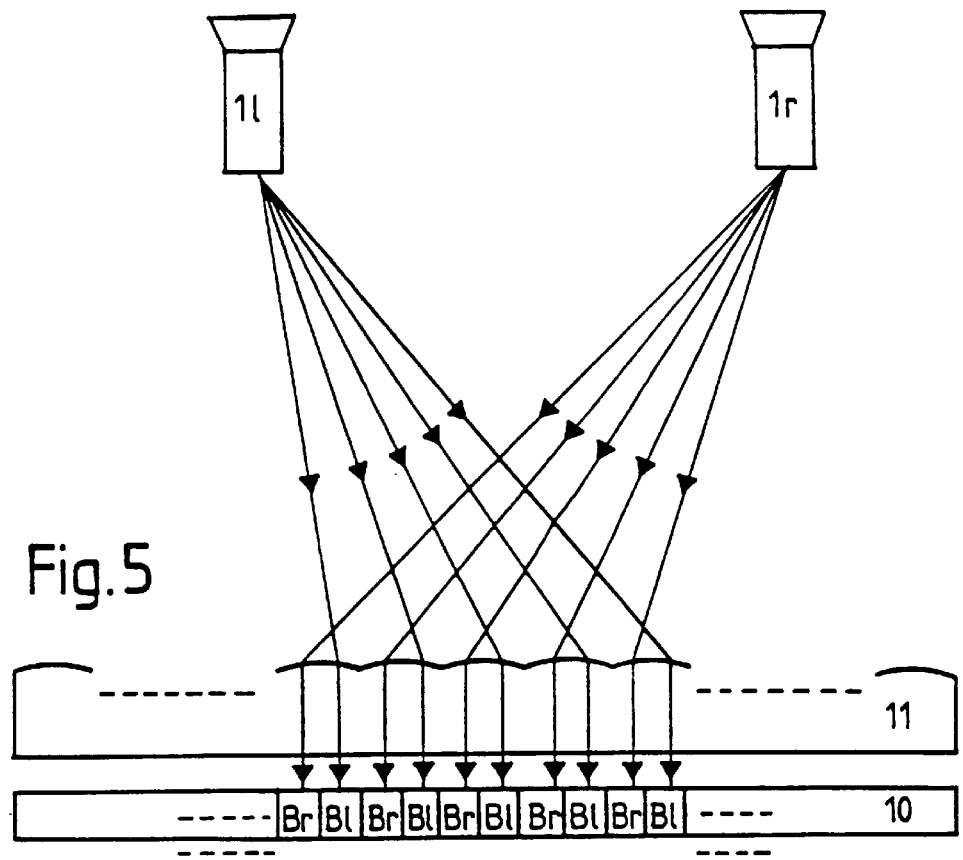

FIG. 5 shows the optical units 1*l*, 1*r*, the lens-like arrangement 11 and the image recording or image display device 10. The optical units 1*l*, 1*r* are fitted over the lens-like arrangement 11 in such a way that the emergent beams from the optical unit 1*l*, 1*r* pass to the curved surface of the lens-like arrangement 11 and, as a result of the refraction of the beams, in each case a pixel by pixel assignment is guaranteed on the image recording or image display device 10 for the left and right eye Bl, Br.

Figure 6:
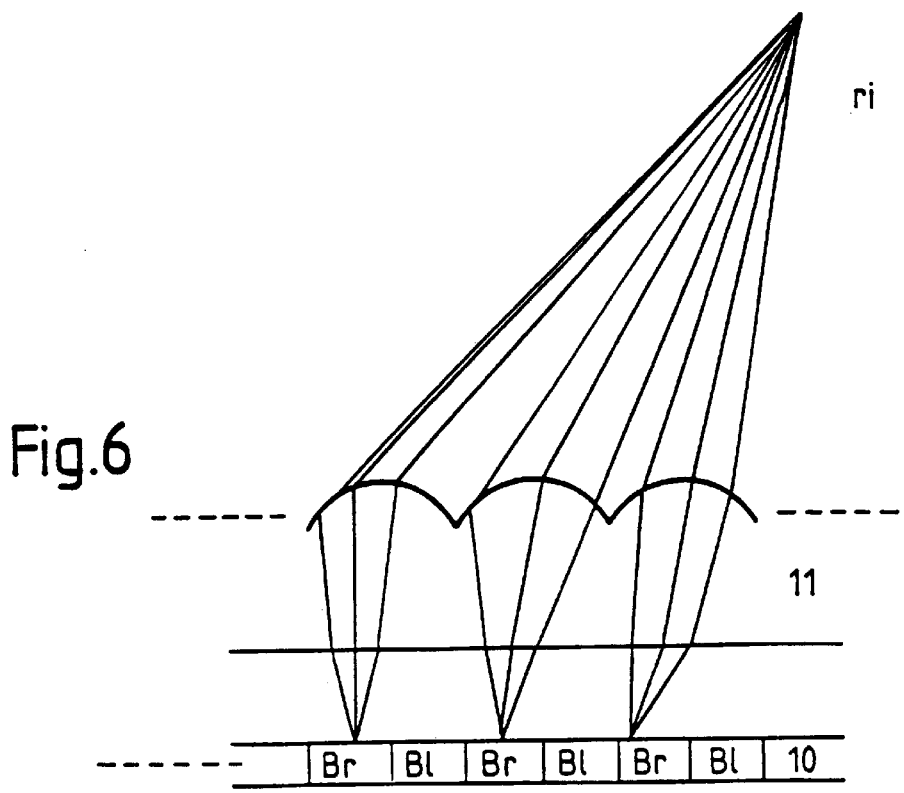

FIG. 6 is an enlarged representation of the beams registered via the right optical unit. The beams pass to the lens-like arrangement 11 and, as a result of the refraction of the beams in the lens-like arrangement 11, the beams pass to the envisaged right pixels Br of the image recording or image display device 10.

Figure 7:
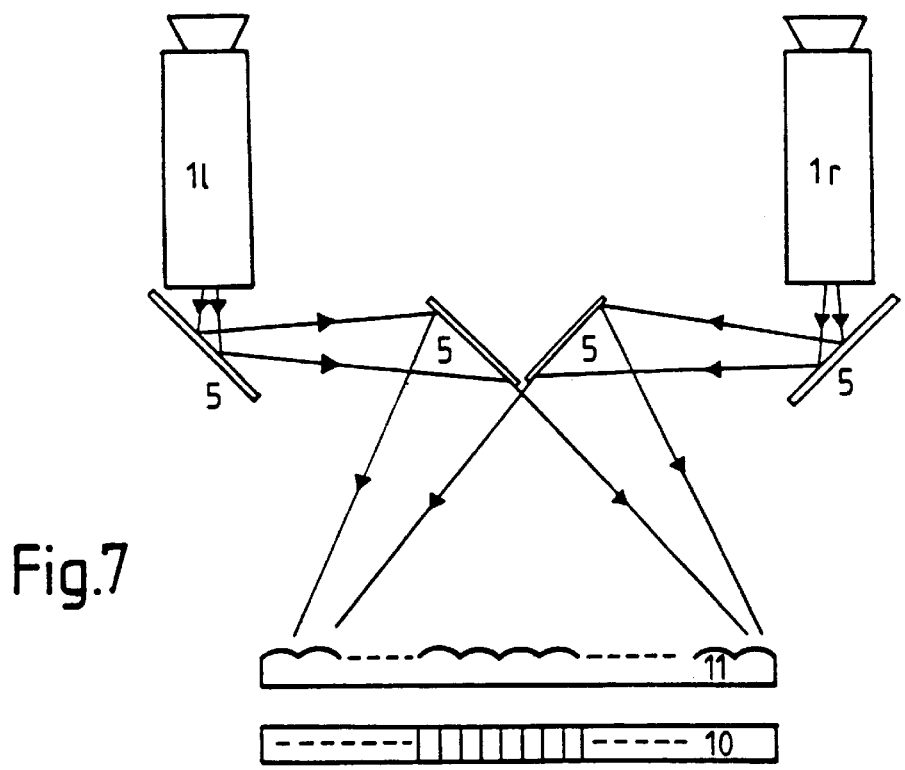

FIG. 7 shows how, via the optical units 1l, 1r, the beams pass via the mirrors 5 and the lens-like arrangement 11 to the image recording or image display device 10.

Figure 8:
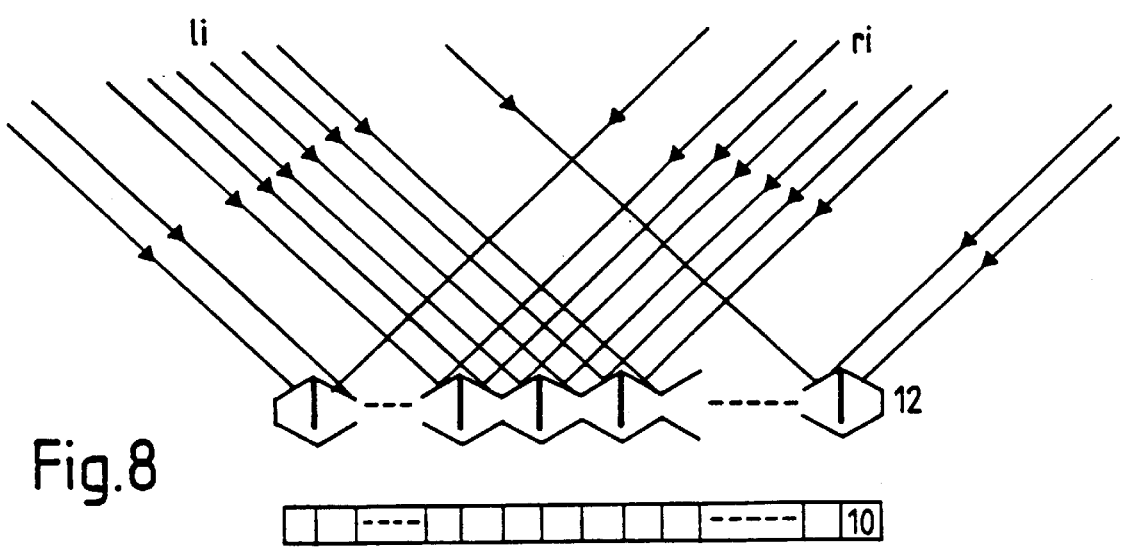

FIG. 8 shows a prism-like arrangement 12 instead of the lens-like arrangement 11. The beams li from the left optical unit and ri from the right optical unit are registered in front of the prism-like arrangement 12 and passed on to the image recording or image display device 10.

Figure 9:
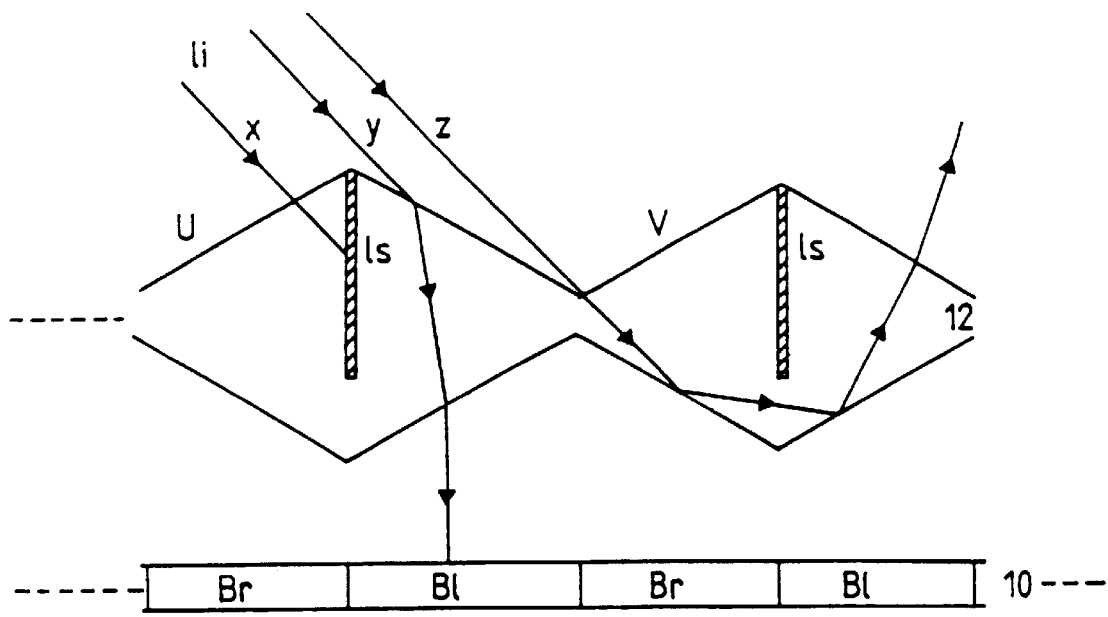

FIG. 9 is an enlarged representation of the prism-like arrangement. Here, three beams li are split into X, Y and Z. The left beam X is incident on the side U of the prism and, as a result of too low a refraction of the beam, this passes to a so-called lens shield ls, with the result that the beam does not reach a pixel field which is reserved for the right optical unit. The beam Y, as desired, reaches a left pixel region Bl as a result of the refraction. The beam Z is incident on the edge V of the prism-like arrangement 12 and, as a result of the different refractions, no longer passes out of the prism-like arrangement 12 to the image recording or image display device 10.

Figure 10:
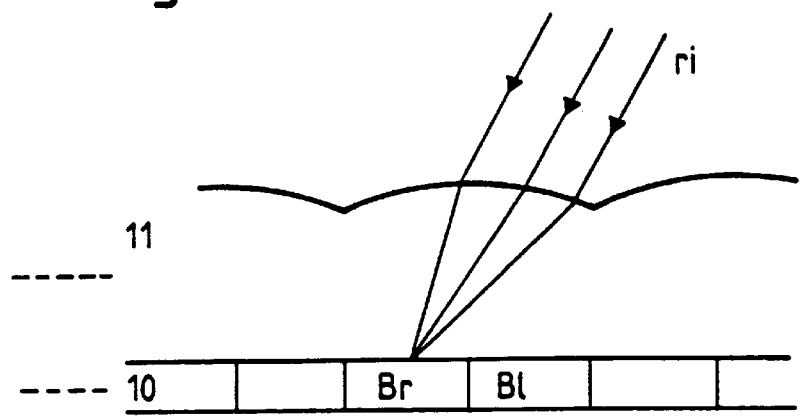

FIG. 10 shows once more the lens-like arrangement 11, which is connected directly to the image recording or image display device 10. The beams ri from the right optical unit 1r, not shown here, pass as a result of refraction to a right pixel region of the image recording or image display device 10.

Figure 11:
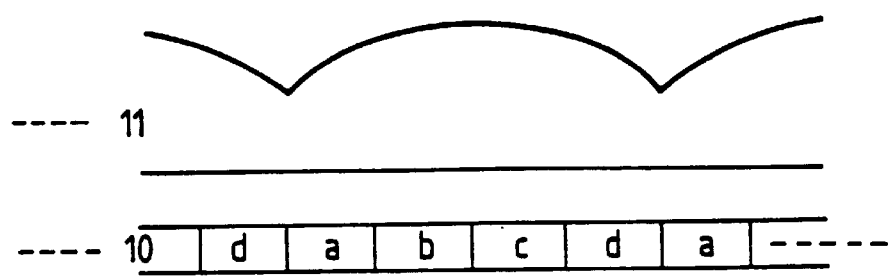
Figure 12:
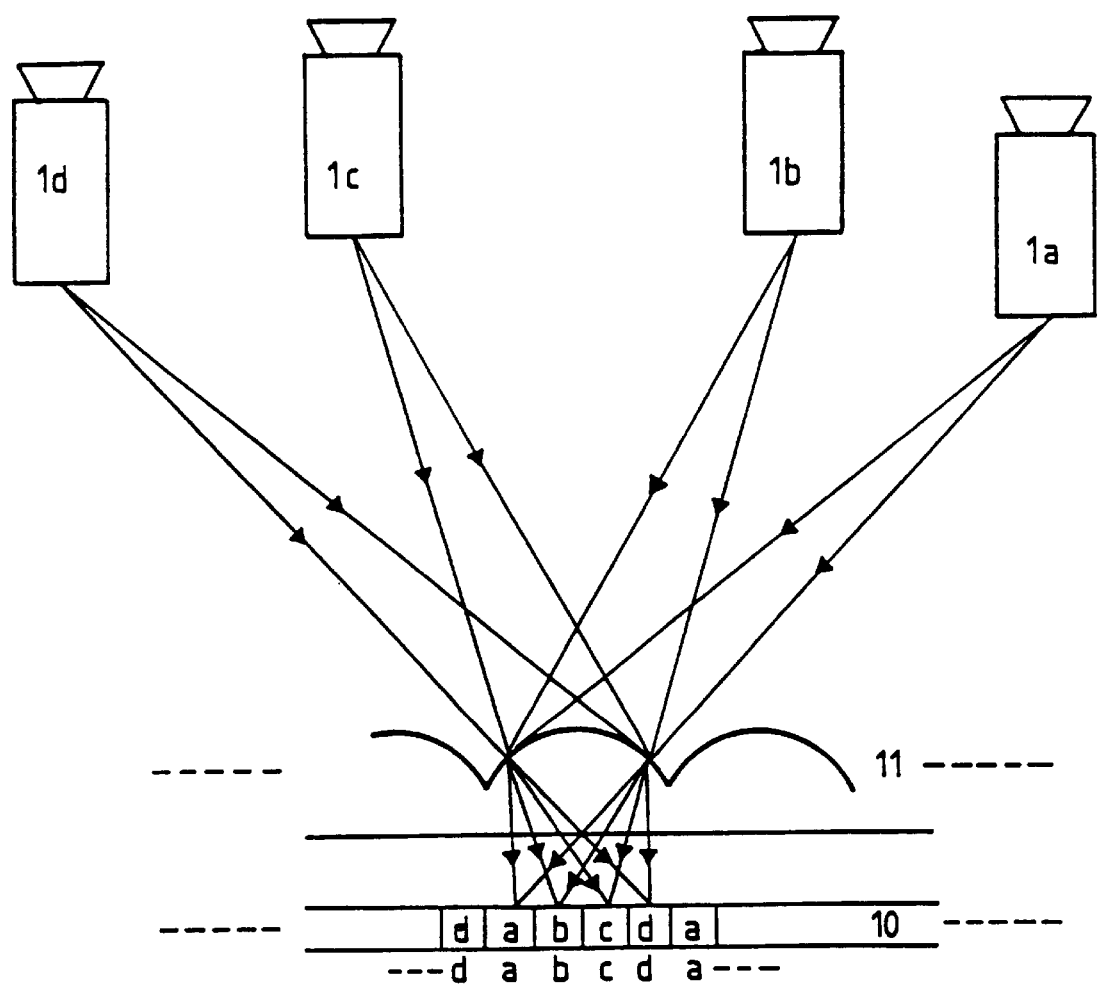

FIG. 11 shows the subdivision of the image recording or image display device 10 for a four-fold pixel representation. The subdivision is alternately a, b, c, d. The beam path can be seen in FIG. 12. The optical units 1a, 1b, 1c and 1d register the object, not shown here. The beams are led by the optical units to the lens-like arrangement 11. As a result of refraction of the beams, they pass to the respective matrix field a, b, c, d of the optical unit.

Further exemplary embodiments of the invention are shown in the following drawings.

Figure 13:
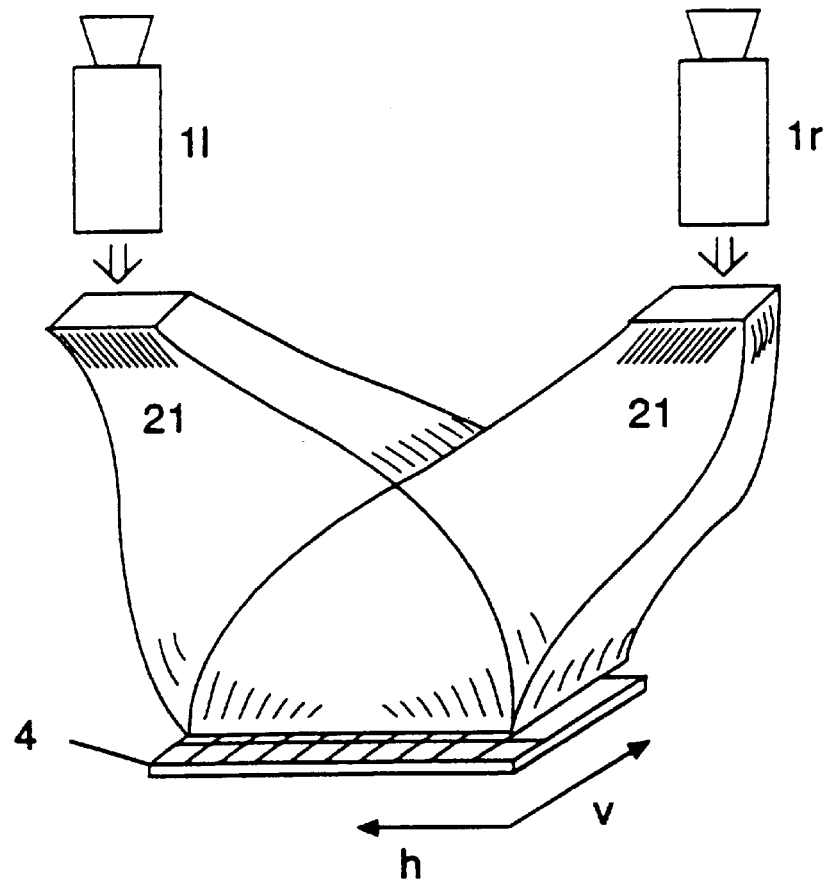

FIG. 13 shows a left optical unit 1l, a right optical unit 1r, a fibre bundle 21, an image recording or image display device 4, the horizontal direction h and the vertical direction v. The image region for the left eye is registered using the optical unit 1l. The image region for the right eye is registered using the optical unit 1r. Both the optical units 1l, 1r lead the beams to the respective plane of the fibre bundle 21. The fibres of the fibre bundle 21 are arranged on the side of the surface arranged towards the image recording or image display device in such a manner that, in accordance with FIG. 14, in each case vertical strip image regions sli for the left eye and strip image regions rli for the right eye result in the horizontal direction.

Figure 14:
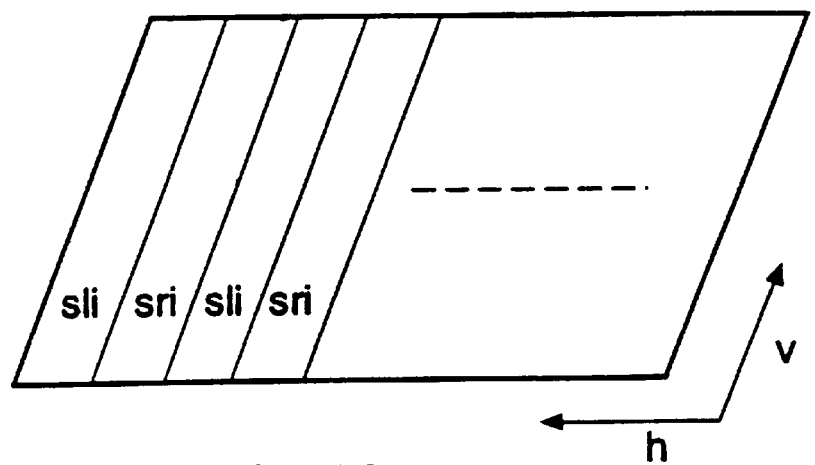

FIG. 14 shows the alternating representation of the strip image regions sli, rli for the left and right eye in the horizontal direction.

Figure 15:
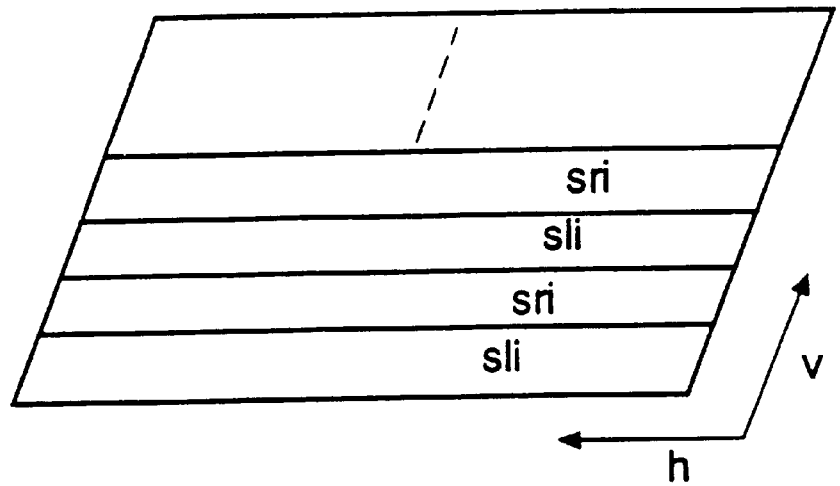

FIG. 15 shows the alternating sequences of the strip image regions sli, rli for the left and right eye in the vertical direction. If the arrangement for the vertical direction is used, it is necessary to use a video signal processor for the stereoscopic display and a lens-like arrangement.

Figure 16:
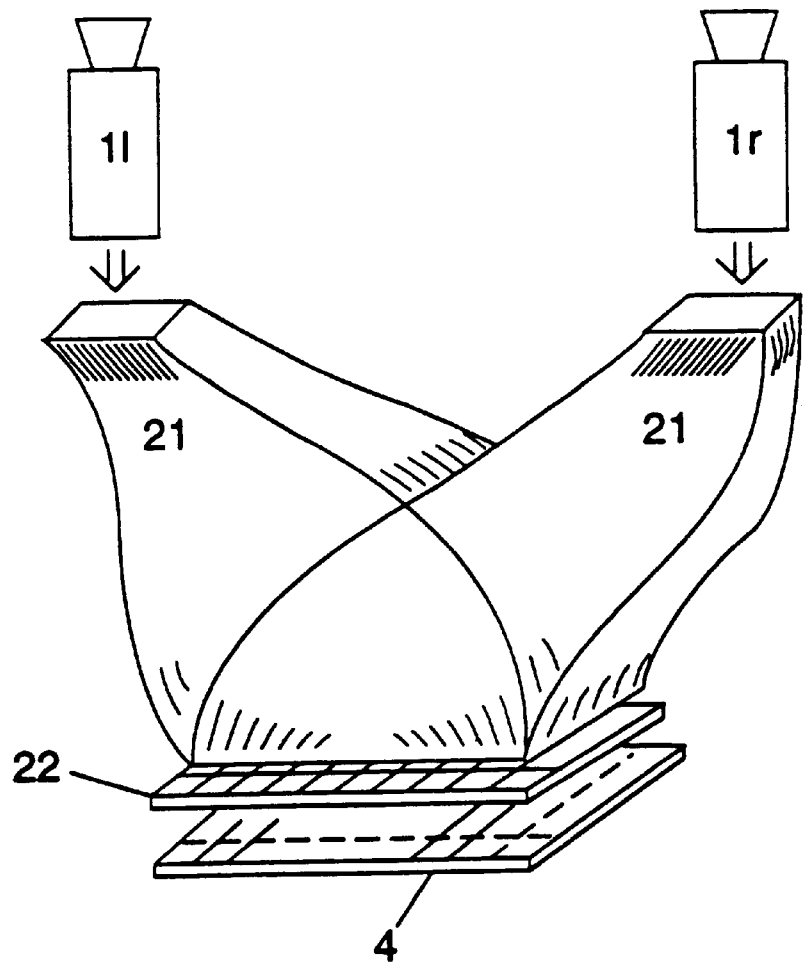

FIG. 16 shows the fibre bundle unit 21, the optical units 1l, 1r, a colour filter 22 and the image recording or image display device 4. In this arrangement, the colour filter 22 is preferably arranged before the image recording or image display device 4, since in this manner only one colour filter has to be used.

Figure 17:
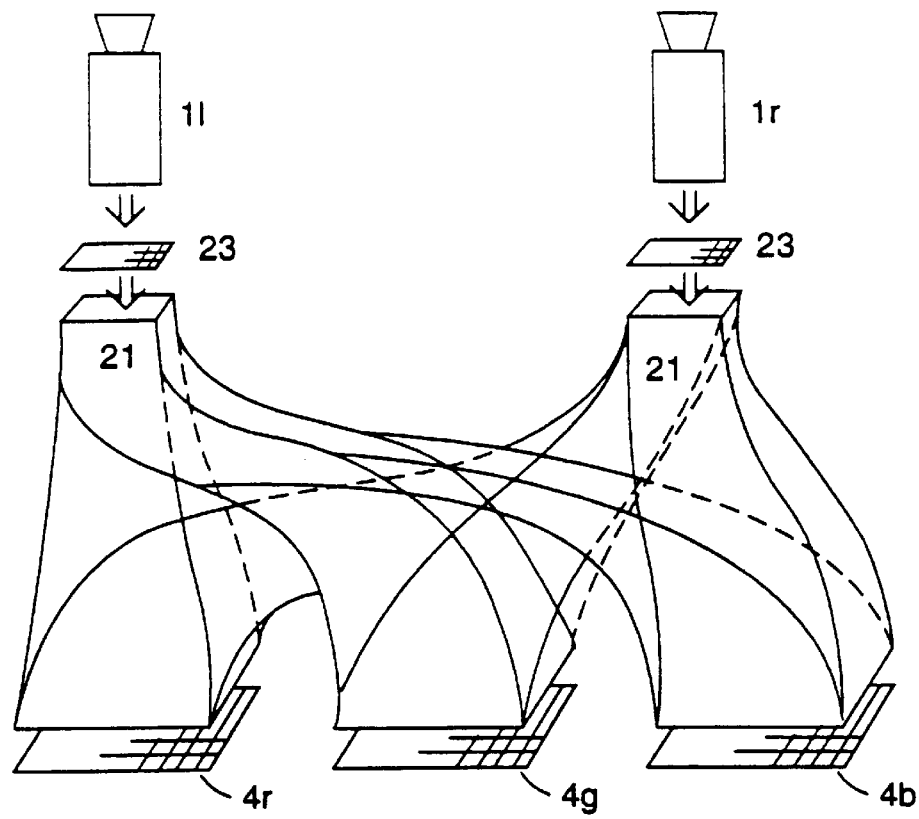

FIG. 17 shows the optical units 1l, 1r, the matrix colour filter 23, a fibre bundle unit 21 and the image recording or image display device for red, green and blue 4r, 4g, 4b. In each case the beam path extends through the optical units 1l, 1r to the respectively associated matrix colour filter 23, further to the fibre bundle 21 and ends on the image recording or image display devices red 4r, green 4g and blue 4b.

Figure 18:
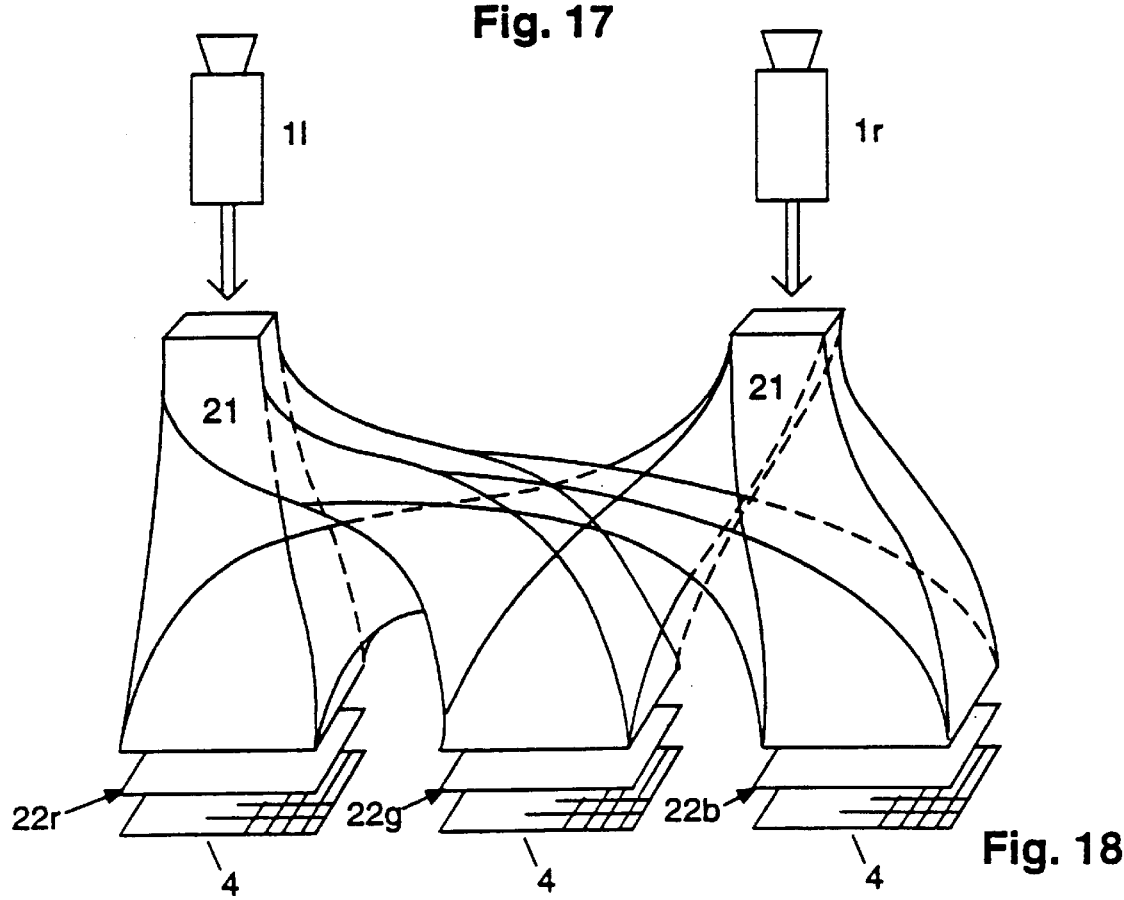

FIG. 18 shows the optical units 1l, 1r, the fibre bundle unit 21, the colour filters red 22r, green 22g, blue 22b and the image recording or image display device 4. The beam path extends via the optical units 1l, 1r via the fibre bundle unit 21, through the respective colour filter red 22r, green 22g and blue 22b, to the image display devices 4.

Figure 19:
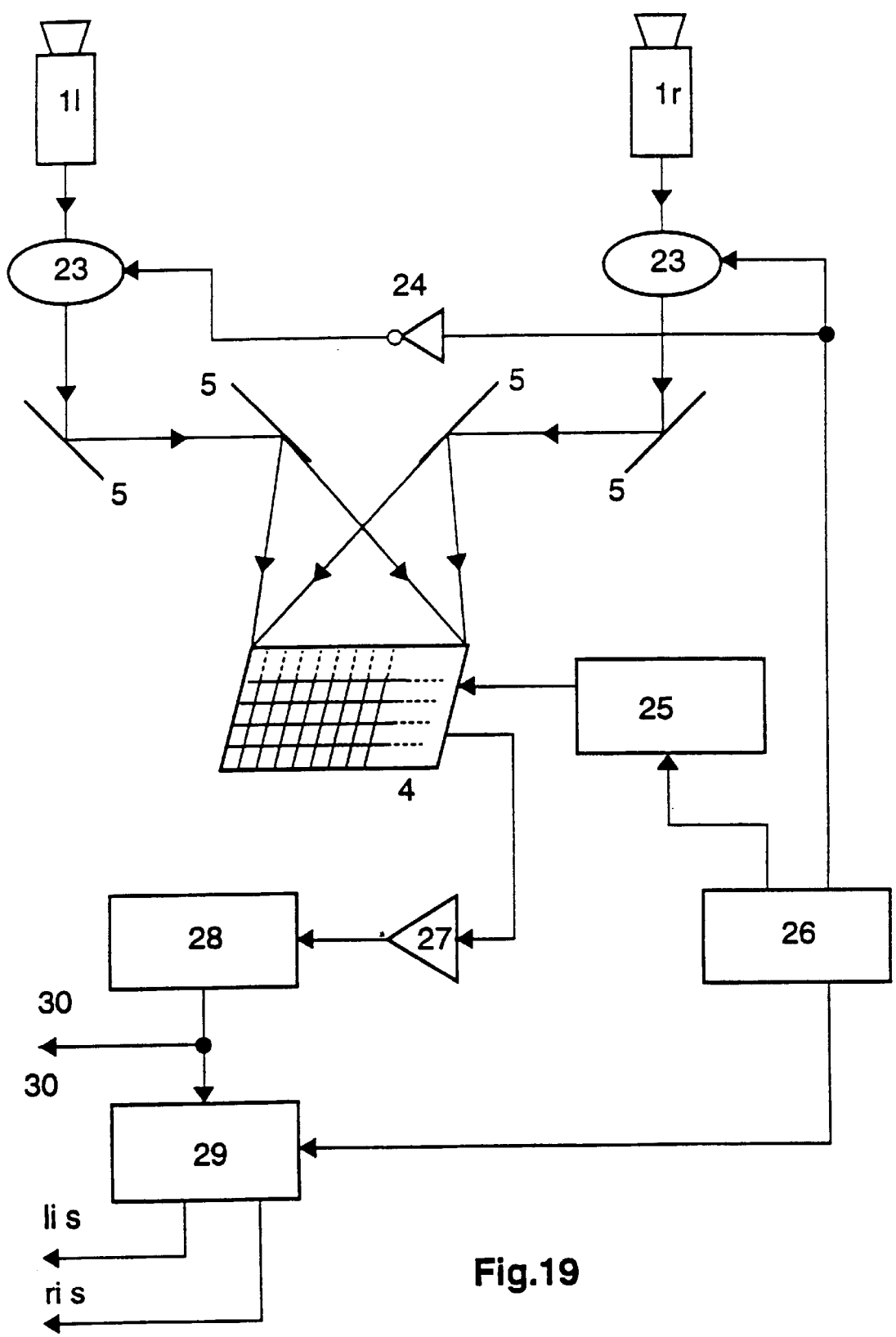

FIG. 19 shows the optical units 1l, 1r, the exposure units 23, the negation unit 24, the mirrors 5, the image recording or image display device 4, the image display driver unit 25, the timing control unit 26, the amplifier 27, the video signal processor 28, the image switch 29, the timing division signal for a stereoscopic image 30 and the signals for the left and right image lis, ris. The object, not shown here, is registered by the optical unit 1l, 1r. The respective beams are led via the exposure unit 23 and the mirrors 5 to the image recording or image display device 4.

The exposure unit 23 is driven via the timing control unit 26. The negation unit 24 is used for the purpose of allowing in each case only the beams from the left optical unit 1l or those from the right optical unit 1r to pass through. The exposure unit 23 can preferably be of mechanical design or also in the form of a liquid-crystal exposure unit. The timing control unit 26 furthermore drives the image recording or image display device driver unit 25 and also the image switch 29. The driving is carried out in such a way that the image recording or image display device 4 is informed in each case as to whether the beams from the left optical unit 1l or from the right optical unit 1r are incident on it. This information is also communicated to the image switch 29. The image recording or image display device 4 passes the signals further to the video signal processor 28 via the amplifier 27. The timing division signal for the stereoscopic image 30 is applied to the video signal processor 28. This signal is also passed on to the image switch 29, which in each case switches through the left image signal lis and the right image signal ris.

Figure 20:
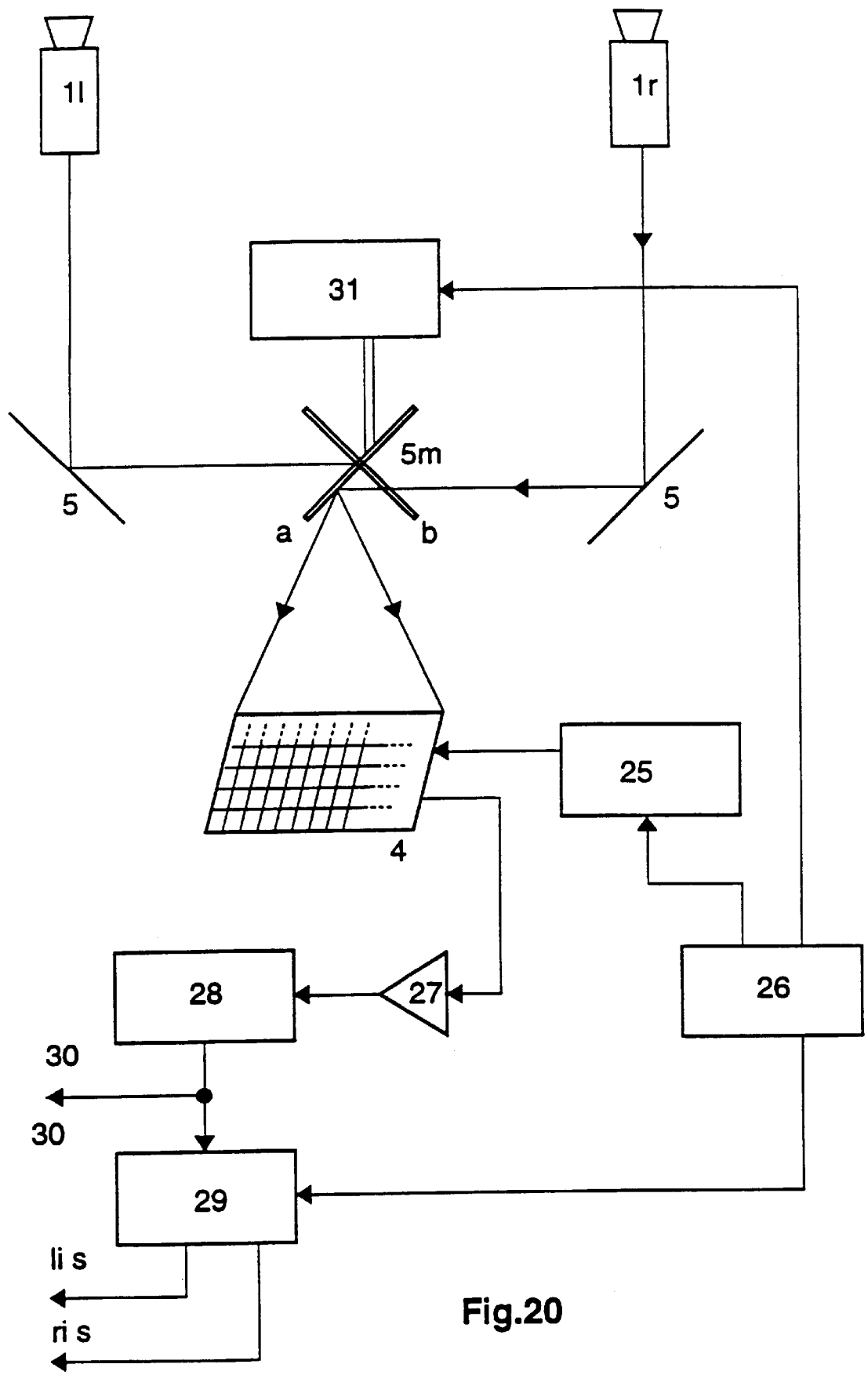

FIG. 20 has, in the lower portion, the same construction as FIG. 19. The difference from FIG. 19 consists in the fact that the exposure units 23, the negation unit 24 and a mirror 5 have been omitted. Technically, the control of the beams is achieved by means of a movable mirror 5m which is driven by a controller 31 via the timing control unit 26. The timing control unit 26 thus drives the controller 31 in such a way that the movable mirror 5m is located respectively in position a for the beams from the optical unit 1r and in position b for the beams from the optical unit 1l. The processing of the beams takes place in the same way as described in FIG. 18.

Figure 21:
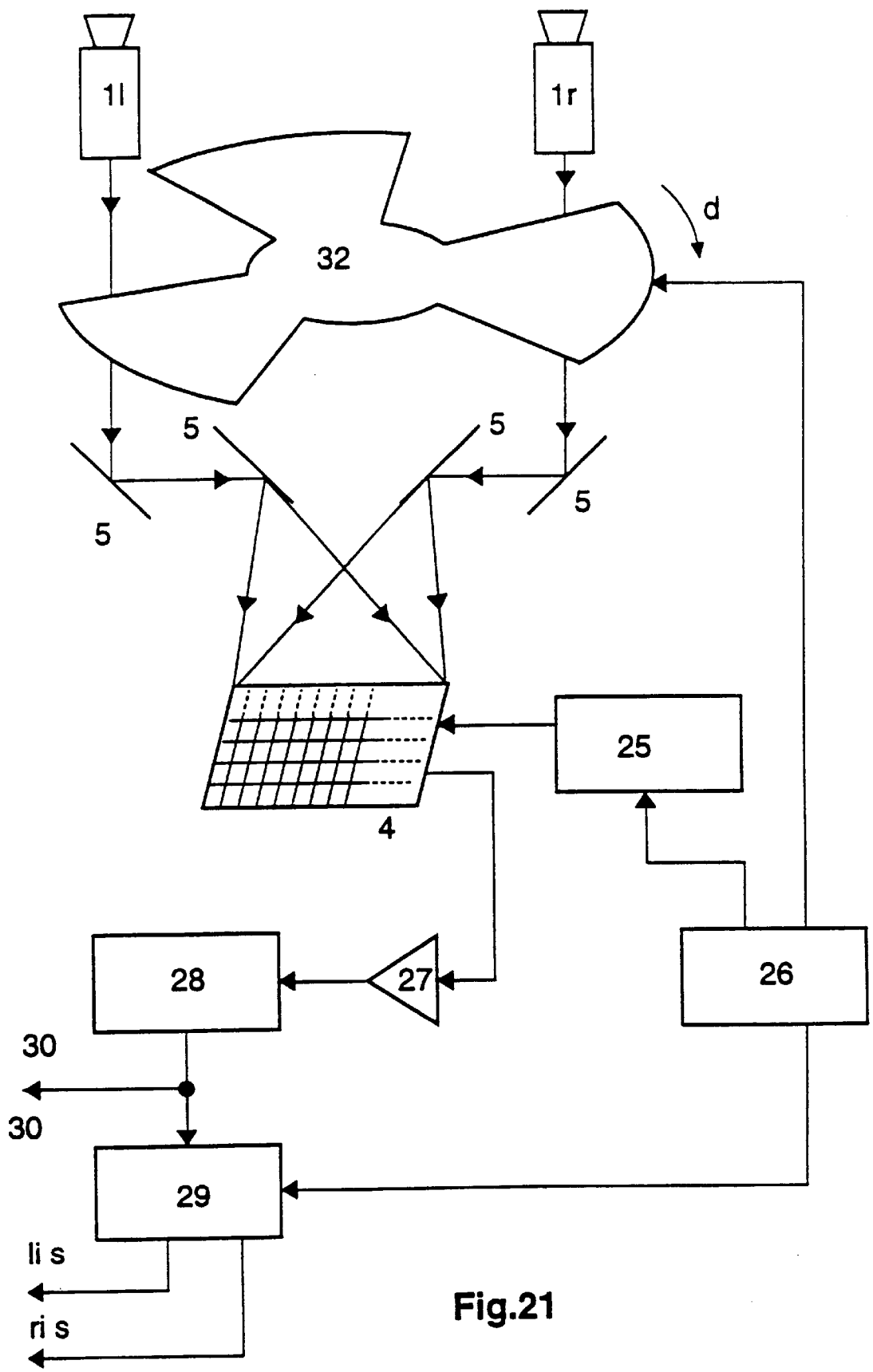

FIG. 21 shows a similar construction to FIG. 19. The units in the lower portion of the picture are identical to FIG. 19. A change with respect to FIG. 19 consists in the rotating exposure unit 32. The timing control unit 26 drives the rotating exposure unit 32 in such a way that the beams from the left optical unit 1*l* and from the right optical unit 1*r* respectively successively reach the image recording or image display device 4. The processing with the timing control unit 26 corresponds to the function described with regard to FIG. 19. The direction of rotation is shown by the arrow d.

Figure 22:
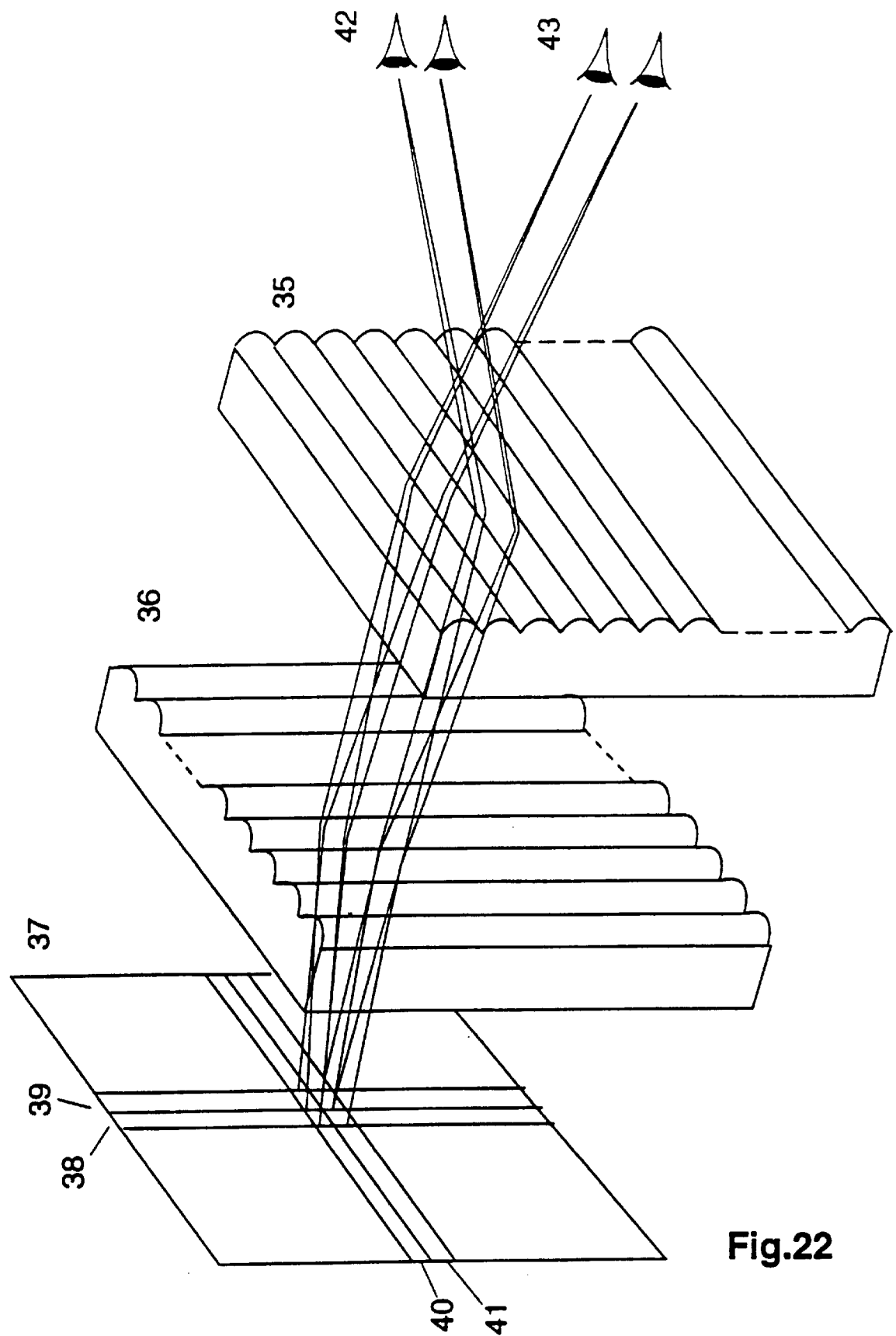

FIG. 22 shows a lens-like arrangement 35 in the vertical direction, a lens-like arrangement 36 in the horizontal direction and a modified image recording or image display device 37. In an arrangement of such a design, the result for the observer is a stereoscopic image in the case of a movement in the horizontal direction or in the case of a movement in the vertical direction of the eyes. The observation position of the eyes at the top is shown by 42. The observation position of the eyes at the bottom is shown by 43. The result on the modified image recording or image display device 37, as a result of the vertically and horizontally arranged lens arrangements, is in each case one image 38 for the right eye, one image 39 for the left eye, one image 40 for the lower observation position and one image 41 for the upper image observation position. It is also possible to construct the arrangement 37 by means of a flat panel display.

FIG. 23 shows the top view of the arrangement shown by FIG. 22. It can furthermore be seen from this view that in each case the pixels Be for the left eye and the pixels Br for the right eye are shown on the modified image recording or image display device 37.

FIG. 24 represents the side view of the arrangement described with regard to FIG. 22. There it can be seen that the modified image recording or image display device 37 has an image region 41 of the upper image observation position and an image region 40 for the lower image observation. By means of an arrangement of this type of vertical and horizontal lens arrangements, it is thus possible to observe the images split up onto the modified image recording or image display device 37 stereoscopically. The splitting up onto the modified image recording or image display device is carried out in each case pixel by pixel in the horizontal direction, matched for the right and left eye and in the vertical direction to the upper and lower observation position of the image, so that a type of matrix results.

Figure 25:
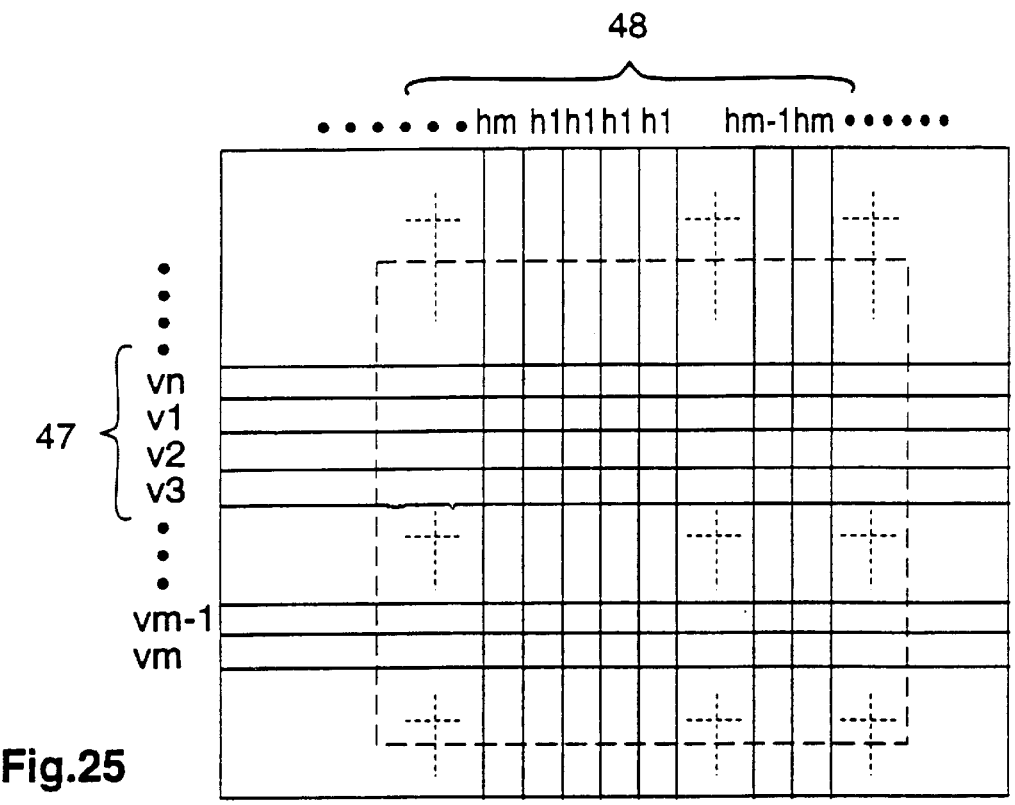

FIG. 25 shows a matrix of this type, made of the vertically different images 47 having vertical image regions Vm, V1, V2 . . . to Vm−1, Vm and of the various horizontal images 48 having horizontal image regions hm, h1, h2 . . . to hm−1, hm.

Figure 26:
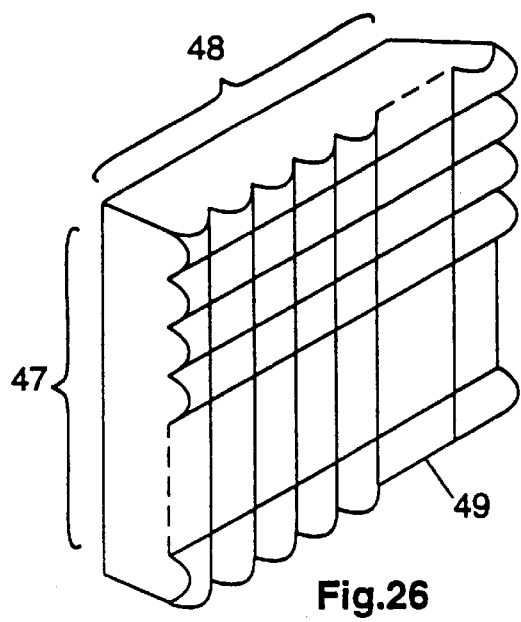

FIG. 26 shows a combination of the horizontal and vertical arrangement of the lenses. Hence, the different vertical image regions 47 and different horizontal image regions 48 are registered using a modified lens-like arrangement 49.

Figure 27:
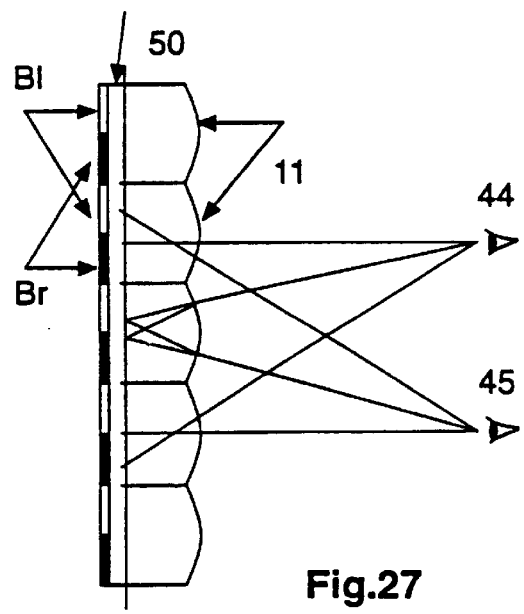

FIG. 27 shows a lens-like arrangement 11, the right eye 44, the left eye 45, pixels Bl for the left eye, pixels Br for the right eye and a front glass for the display 50. By observing the image through a lens-like arrangement 11 and by displaying the image in pixel form, a stereoscopic image can be perceived with the eyes.

Figure 28:
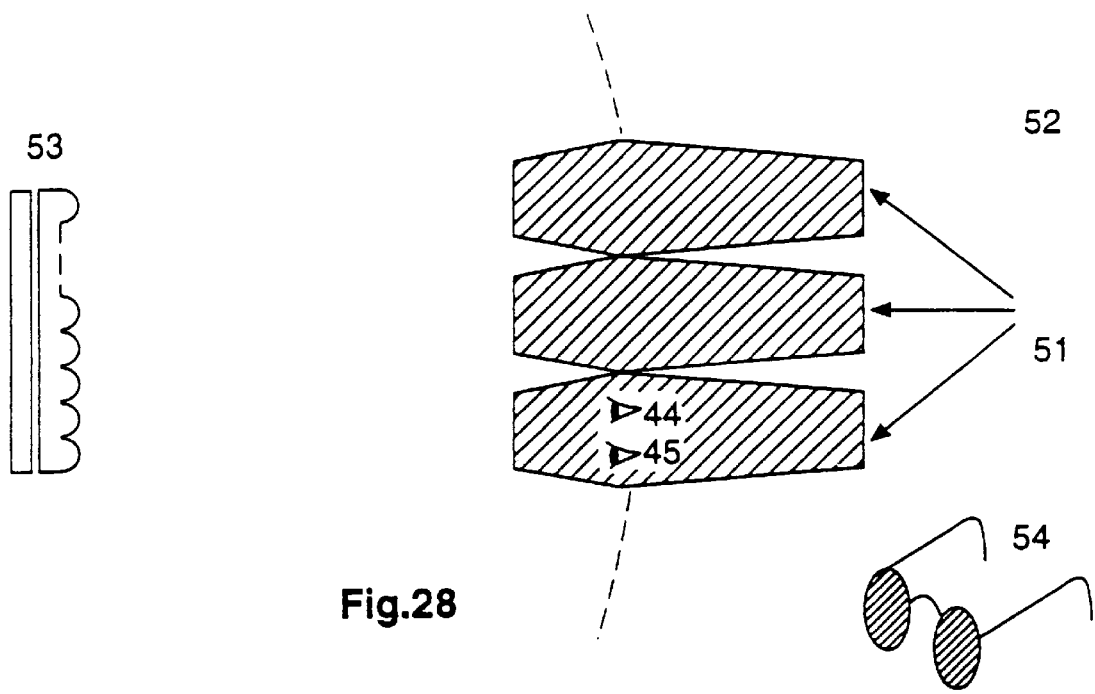

FIG. 28 shows a stereoscopic display 53, a stereoscopic image region 51 without spectacles, a stereoscopic image region 52 with spectacles, polarized spectacles 54, a right eye 44 and a left eye 45. If the observer is located in the stereoscopic image region 51, he perceives a stereoscopic image even without the specially polarized spectacles 54. If the observer leaves the region, a stereoscopic image can be perceived only using the polarized spectacles 54. In order that a stereoscopic image can be perceived using polarized spectacles, the stereoscopic display 53 is constructed as shown in FIG. 29.

Figure 29:
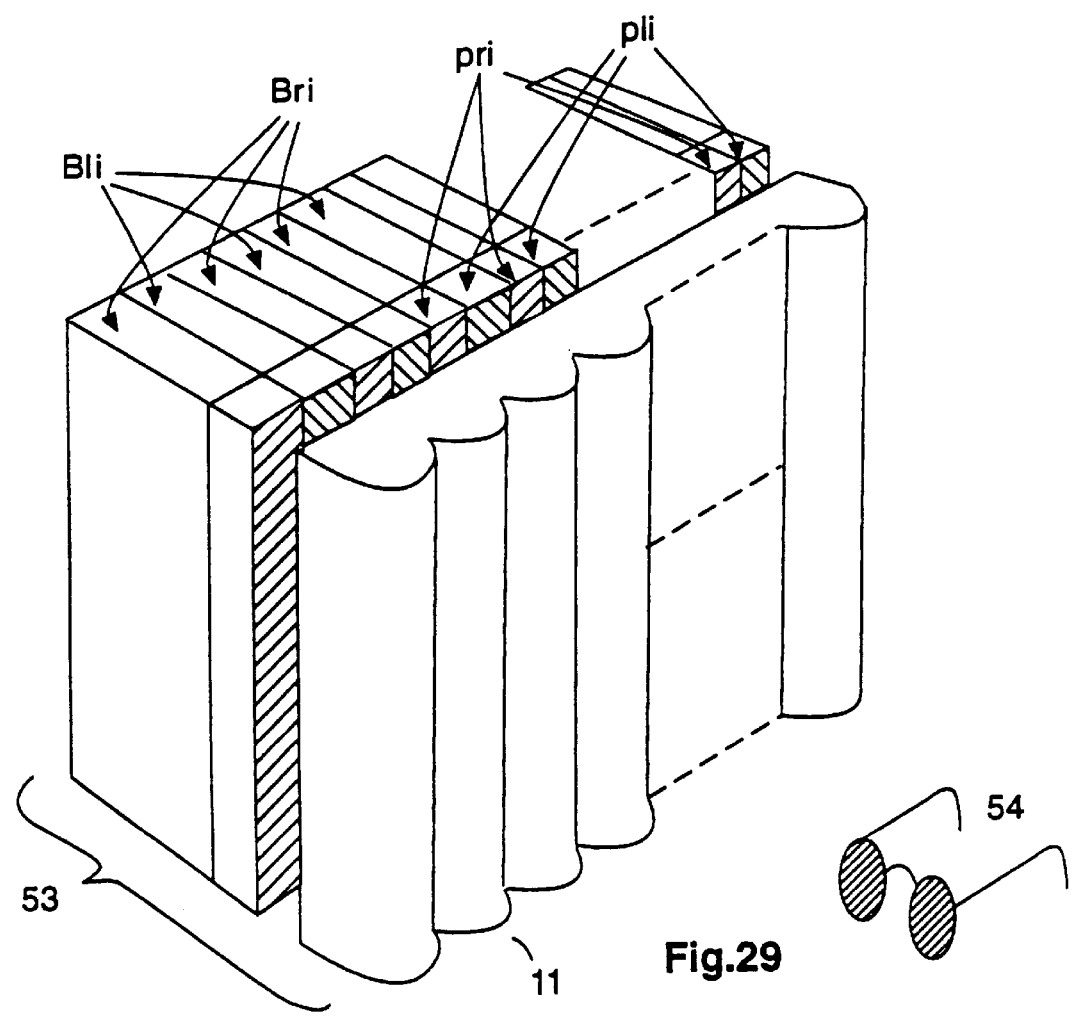

FIG. 29 shows the polarized spectacles 54, a lens-like arrangement 11, pixels Bli for the left image, pixels Bri for the right image, a polarization arrangement pri for the right image and a polarization arrangement pli for the left image. As a result of an arrangement constructed in this way, it is possible to achieve the impression of a stereoscopic image at various distances, using polarized spectacles. The type of polarization of the spectacles and of the polarization arrangements on the stereoscopic display 53 can be both linearly polarized and circularly polarized.

I claim:

1. A device for recording a stereoscopic image comprising:

an optical unit divided into two optical units for optical registration of a first image and of a second image of an object to be recorded, a first exposure unit for receiving the first image, a second exposure unit for receiving the second image, mirrors for directing said first image and said second image from said exposure units to an image recording or image display device, a video signal processor supplied by signals from the output of said image recording or image display device, an image switch supplied by signals from the output of said video signal processor and outputting signals for the left image and for the right image, a timing control unit being connected directly to a control input of said second exposure unit and via a negation unit to a control input of said first exposure unit for alternately enabling said first exposure unit and disabling said second exposure unit and vice versa, said timing control unit being further connected to a control input of said image recording or image display device in such a way that the image recording or image display device is informed in each case as to whether the beams from the left optical unit or from the right optical unit are incident on it, said timing control unit being further connected to a control input of said image switch for alternately providing the signals for the left image and the right image.

2. The device according to claim 1, wherein an image display driver unit is interposed between the output of said timing control unit and the control input of said image recording or image display device.

3. The device according to claim 1, wherein said exposure units are of mechanical design in form of a movable mirror or in form of a rotating exposure unit.

4. The device according to claim 1, wherein said exposure units have the form of a liquid-crystal exposure unit.

* * * * *